United States Patent [19]
Yoshizumi et al.
[11] Patent Number: 4,877,567
[45] Date of Patent: Oct. 31, 1989

[54] METHOD FOR MANUFACTURING AN ELECTRICALLY INSULATING FORMED CHANNEL MEMBER

[75] Inventors: Yasuji Yoshizumi; Yoshiyuki Matsuoka, both of Ako, Japan

[73] Assignee: Mitsubishi Denki Kabushiki Kaisha, Japan

[21] Appl. No.: 161,027

[22] Filed: Feb. 26, 1988

[30] Foreign Application Priority Data

Mar. 2, 1987 [JP] Japan .................................. 62-47304

[51] Int. Cl.[4] .............................................. B29C 53/04

[52] U.S. Cl. .................................... 264/153; 162/194; 162/196; 264/339; 336/206

[58] Field of Search ................ 264/153, 339; 162/194, 162/196, 204, 205; 174/121 R, 124 R; 336/206, 207, 209

[56] References Cited

U.S. PATENT DOCUMENTS

| | | | |
|---|---|---|---|
| 1,877,629 | 9/1932 | Replogle | 264/339 |
| 1,904,268 | 4/1933 | Bronson | 264/153 |
| 3,189,681 | 6/1965 | Feather | 264/339 |
| 3,351,693 | 11/1967 | Feather et al. | 336/209 |

*Primary Examiner*—James Lowe
*Attorney, Agent, or Firm*—Leydig, Voit & Mayer

[57] ABSTRACT

An electrically insulating formed channel member is made of a sheet of an electrically insulating material capable of being press formed that is cut to provide radially projecting portions. Thereafter, the sheet is press-formed to form a formed channel member including the channel portion and the projection portions and bent to extend along the inner corner of a rectangular pancake coil with the web located at the inner side of the corner curvature. The sheet material may preferably be a dray paper press board. Ripples may be provided in the sheet material prior to the step of press-forming. The moisture in the sheet material may also be adjusted prior to the step of press-forming.

5 Claims, 3 Drawing Sheets

METHOD FOR MANUFACTURING AN ELECTRICALLY INSULATING FORMED CHANNEL MEMBER

BACKGROUND OF THE INVENTION

This invention relates to a method for manufacturing an electrically insulating formed channel member which is applied to the inner corners of a coil of an electrical apparatus such as a rectangular pancake coil primarily used in a shell type transformer reactor.

In FIGS. 1 and 2, the manner in which a substantially rectangular pancake coil 1 is electrically insulated is illustrated. In an electrical apparatus, in order to mechanically support the rectangular pancake coil 1 against the electromagnetic force of the electrical apparatus, the rectangular pancake coil 1 is supported and insulated by a plurality of electrically insulating spacers 3 disposed on both of the major surfaces of the coil and by and an electrically insulating formed channel member 2 disposed at an inner corner of the rectangular pancake coil 1. The channel member 2 comprises a channel portion *4b* including a web section *2a* and flange sections *2b*, and a plurality of projection portions *4a* extending radially outwardly from the flange sections *2b*. The channel portion *4b* is bent along the inner corner of the rectangular pancake coil 1 with the web section *2a* located at the inner curvature of the corner. The channel member 2 is mounted at the corner of the rectangular pancake coil so that the flange sections *2b*and the projection portions 4a are in contact with both major surfaces of the pancake coil 1. The electrically insulating formed channel member 2 is made of a sheet of an electrically insulating material, generally press board. In the embodiment illustrated in FIG. 2, the flange sections *2b* are in contact with the upper and lower major surfaces of the rectangular pancake coil 1.

The conventional method for manufacturing the electrically insulating formed channel member 2 is illustrated in FIGS. 3 to 6. In FIG. 3 a sheet of an electrically insulating material capable of being press formed, such as dry paper press board with a 6% to 8% moisture content, is cut into a rectangular sheet of predetermined dimensions to obtain a press board 5. Then, the press board 5 is provided with ripples 6 to form a rippled press board 16 as shown in FIG. 4. The rippled press board 16 thus formed is immersed in pure water contained in a vessel (not shown) until the board 16 contains the proper amount of moisture. The rippled press board 16 is then press-formed at an elevated temperature to form a channel member bent along the inner corner of the rectangular pancake coil 1 as shown in FIG. 5. The channel member thus formed has a substantially U-shaped cross section and has a web portion *2a* and flanges 4. Finally, the formed channel member shown in FIG. 5 is cut to remove a portion of the material of the flanges 4 to provide a plurality of projection portions *4a* extending from the radially outer edge of flange portions *4b* as shown in FIG. 6. In the illustrated example, the projection portions *4a* have a radial dimension of a, the flange portions *4b*have a width dimension of b, and the flange 4 of the channel member 16 before cutting, i.e., as shown in FIG. 5, has a width of a+b.

In the above described conventional manufacturing method, however, a problem arises that cracks 9 as shown in FIG. 7 form in the radially outer edges of the flanges 4 during the press-forming of the rippled press board 16 of FIG. 4 into the formed channel member 16 of FIG. 5. During the press-forming of the channel member 16, compressive forces, as shown by arrows 7, are applied to the inner edge of the flange 4 of the formed channel member 16. Tensile forces, as shown by an arrow 8, are applied in the outer edge of the flange 4. This tensile force shown by the arrow 8 may exceed the tensile strength of the press board, resulting in the cracks 9 at the radially outer edge of the flanges 4. These cracks 9 easily appear when the radius of curvature of the inner corner of the rectangular pancake coil 1 is relatively small or when the width dimension a+b of the flange 4 is relatively large.

SUMMARY OF THE INVENTION

Accordingly, an object of the present invention is to provide a method for manufacturing an electrically insulating formed channel member for use in the electrical insulation of an inner corner of a substantially rectangular pancake coil free from cracks in the flanges of the channel member.

Another object of the present invention is to provide a method for manufacturing an electrically insulating formed channel member free from the cracks in the flanges of the channel member without increasing the number of steps.

With the above objects in view, the present invention is a method for manufacturing an electrically insulating formed channel member for use in electrically insulating an inner corner of a substantially rectangular pancake coil. The channel member comprises a channel portion including a web section and flange sections and a projection portion extending radially outwardly from the flange sections. The channel member is bent to extend along the inner corner of the rectangular pancake coil with the web located at the inner side of the curvature. According to the manufacturing method of the present invention, a sheet of an electrically insulating material capable of being press formed is prepared and a portion of the sheet material is cut to provide the projection portion. After the sheet material is cut, it is press-formed to form a formed channel member including the channel portion and the projection portion and bent to extend along the inner corner of the rectangular pancake coil with the web located at the inner side of the corner curvature.

The sheet material may preferably be a dray paper press board. Ripples may be provided in the sheet material prior to the step of press-forming. The moisture in the sheet material may be adjusted prior to the step of press-forming.

According to the method for manufacturing an electrically insulating formed channel member of the present invention, the press-forming is carried out only after projection portions have been formed by cutting the dry paper press board. Therefore, the tensile stress acting on the radially outer edges of the flange portions is greatly alleviated as compared with that applied on the outer edges of the flanges manufactured by the conventional method, enabling the substantial prevention of crack formation in the outer edges of the flanges of the channel member during the press-forming.

BRIEF DESCRIPTION OF THE DRAWINGS

The present invention will become more readily apparent from the following detailed description of the preferred embodiment of the present invention taken in conjunction with the accompanying drawings, in which.

PREFERRED EMBODIMENT OF THE INVENTION

FIGS. 8 to 13 illustrate various steps of the method for manufacturing an electrically insulating formed channel member according to one embodiment of the present invention.

Figure 8:
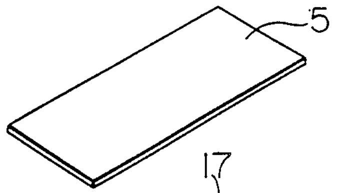
FIGS. 8 to 13 are perspective views illustrating the steps in the method for manufacturing an electrically insulating formed channel member according to the present invention.

In FIG. 8, a sheet of an electrically insulating material capable of being press formed, such as dry paper press board with a moisture content of from 6% to 8%, is cut into a rectangular sheet material or a press board 5.

Figure 9:
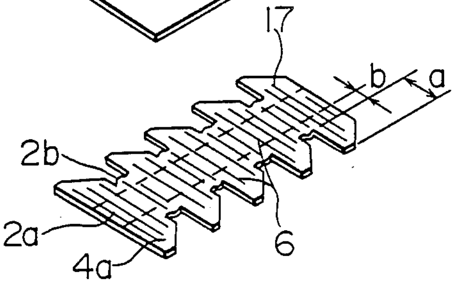

Then, as shown in FIG. 9, the press board 5 is cut to provide the web portion 2*a*, the flange portions 2*b* having a width dimension of b and the projection portions 4*a* having a height dimension of a. Preferably, the press board 5 is provided with ripples 6 to form a cut and rippled press board 17 shown in FIG. 9 so that the tensile and compressive stresses acting in the press board during the press-forming may be absorbed.

Figure 10:
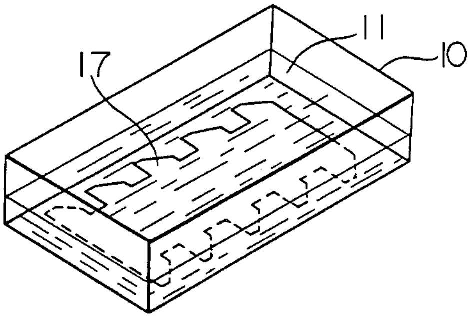

As shown in FIG. 10, the wrinkled press board 17 thus formed is immersed in pure water 11 contained in a vessel 10 until the press board 17 contains the proper amount of moisture.

Figure 11:
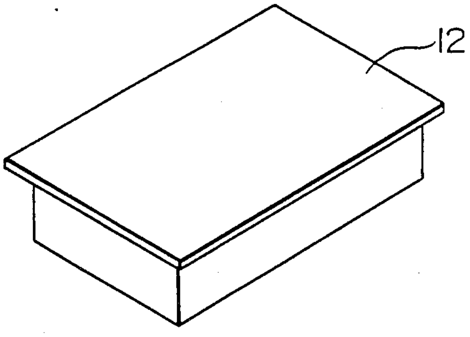

Then the cut press board 17 containing moisture is taken out from the vessel 10 and is placed within a moisture regulating container 12 shown in Fig. 11. The press board 17 is maintained in the container 12 for a few hours until the cut press board 17 is uniformly moisturized.

Figure 1:
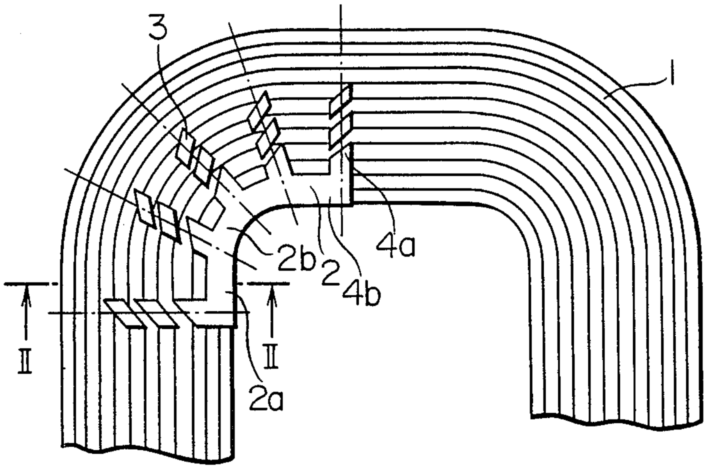
FIG. 1 PRIOR ART
FIG. 1 is a plan view showing an example in which an electrically insulating formed channel member is applied to a rectangular pancake coil.
Figure 2:
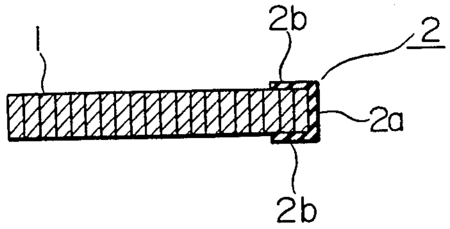
FIG. 2 PRIOR ART
FIG. 2 is a sectional view taken along line II—II of FIG. 1.
Figure 3:
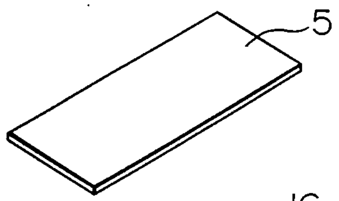
FIG. 3 PRIOR ART
FIGS. 3 to 6 are perspective views illustrating the steps of the conventional method for manufacturing an electrically insulating formed channel member.
Figure 4:
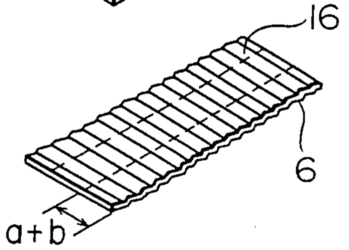
FIG. 4 PRIOR ART
Figure 5:
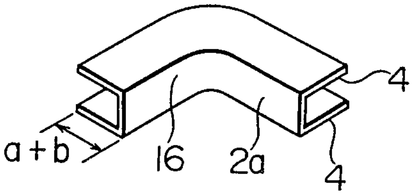
Figure 6:
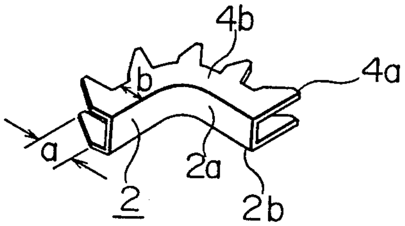
FIG. 6 PRIOR ART
Figure 7:
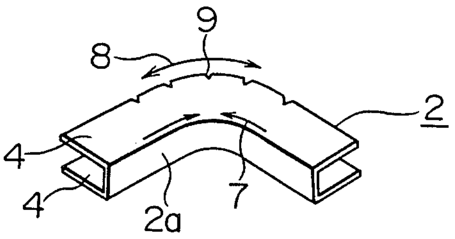
FIG. 7 PRIOR ART
FIG. 7 is a perspective view illustrating the cracks generated in the flanges of the channel member during press-forming in a conventional manufacturing method.
Figure 12:
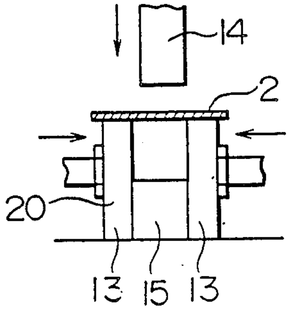

The press board 17 is then press-formed at an elevated temperature by a press shown in FIG. 12 to form a channel member 2 bent to extend along the inner corner of the rectangular pancake coil 1 as shown in FIGS. 1 and 2.

Figure 13:
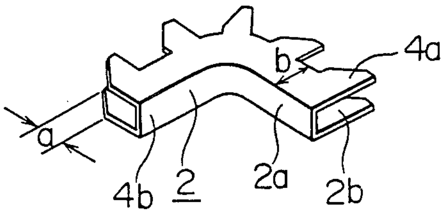

The channel member 2 thus formed is illustrated in FIG. 13 from which it is seen that the channel member 2 thus formed has a substantially U-shaped cross section and has the projection portions 4a extending from the radially outer edge of the flange portions 4*b*. In the illustrated embodiment, the projection portions 4*a* have a radial dimension of a and the flange portions 4*b* have a width dimension of b.

The press used is of the type in which side press dies 13 and an upper press die 14 are moved interlockingly while a lower press die 15 is stationary. At the initial stage of pressing, the upper press die 14 descends toward the lower press die 15 with the side press dies 13 opened to press the press board 17 between the upper and lower dies 14 and 15. Then the side press dies 13 are moved toward each other to press the board 17 against the sides of the lowered upper press die 14.

As has been described, according to the manufacturing method of the present invention, the press-forming of the sheet material into the channel-shaped bent member is carried out after the projection portions 4*a* having the length a as well as flange portions 2*b* having the width b have been formed by cutting the press board sheet material. Therefore, the radially outer edges of the flange portions 2*b* are elongated during the press-forming only for a shorter distance corresponding to the width b of the flange portions 2*b* which is shorter than the distance over which the outer edges of the flanges 4 are elongated which corresponds to the distance a+b. Therefore, the stresses applied to the outer edges of the flange portions 2*b* during press-forming are greatly alleviated as compared with those applied on the outer edges of the flanges manufactured by the conventional method, substantially preventing crack formation in the outer edges of the flanges of the channel member during press-forming. This is particularly significant with the formed channel member having inner corners with a small radius of curvature.

What is claimed is:

1. A method for manufacturing an electrically insulating formed channel member for use in electrically insulating an inner corner of a substantially rectangular pancake coil, said channel member comprising a channel portion including a web section, flange sections transversely extending from said web sections and projection portions extending outwardly from said flange sections, said channel member being bent to conform to the inner corner of the rectangular pancake coil with said web located at the inner side of the inner corner, the method comprising:
   - preparing a unitary sheet of an electrically insulating press board capable of being press formed;
   - cutting and removing a portion of said press board to form projection portions along edges of the press board to relieve tensile stresses in said flange sections during press forming of the channel member; and
   - press forming said press board to form a formed channel member including said channel portion and said projection portion and bent to conform to the inner corner of the rectangular pancake coil with said web located at the inner side of the inner corner with the projection portions disposed transversely to said web.

2. A method for manufacturing an electrically insulating formed channel member as claimed in claim 1 wherein said press board is a dray paper press board.

3. A method for manufacturing an electrically insulating formed channel member as claimed in claim 1 comprising forming ripples in said press board prior to press forming.

4. A method for manufacturing an electrically insulating formed channel member as claimed in claim 1 comprising adjusting the moisture content of said press board prior to press forming.

5. A method for manufacturing an electrically insulating formed channel member as claimed in claim 1 including heating said press board to an elevated temperature and press forming said press board while it is at the elevated temperature.

* * * * *